United States Patent
Ju et al.

[11] Patent Number: 5,974,020
[45] Date of Patent: Oct. 26, 1999

[54] TWO-WAVELENGTH LASER PICK-UP HEAD FOR A DVD

[75] Inventors: Jau-Jiu Ju, Hsinchu Hsien; Shin-Ter Tsai, Taipei; Pei-Yih Liu, Changhua Hsien; Tsung-Ming Yang, Chilung, all of Taiwan

[73] Assignee: Industrial Technology Research Institute, Taiwan

[21] Appl. No.: 08/946,835

[22] Filed: Oct. 8, 1997

[30] Foreign Application Priority Data

Apr. 29, 1997 [TW] Taiwan ................................ 86105588

[51] Int. Cl.⁶ .................................................. G11B 7/00
[52] U.S. Cl. .............................. 369/112; 369/58; 369/110; 369/94; 369/44.24
[58] Field of Search ..................................... 369/112, 110, 369/109, 44.23, 44.24, 118, 58, 94

[56] References Cited

U.S. PATENT DOCUMENTS

| | | | |
|---|---|---|---|
| 4,399,529 | 8/1983 | Leterme et al. | |
| 5,446,565 | 8/1995 | Komma et al. | 369/112 |
| 5,526,338 | 6/1996 | Hasman et al. | 369/110 |
| 5,615,200 | 3/1997 | Hoshino et al. | 369/116 |
| 5,636,190 | 6/1997 | Choi | 360/110 |
| 5,696,747 | 12/1997 | Bartholomeusz | 369/100 |
| 5,696,749 | 12/1997 | Brazas, Jr. | 369/112 |
| 5,696,750 | 12/1997 | Katayama | 369/112 |
| 5,771,122 | 5/1991 | Shuman | 369/110 |
| 5,777,971 | 5/1996 | Choi | 369/109 |
| 5,790,503 | 11/1996 | Mizuno et al. | 369/110 |
| 5,793,734 | 4/1997 | Tsuchiya et al. | 369/44.24 |
| 5,802,037 | 9/1996 | Lee et al. | 369/94 |
| 5,809,000 | 5/1997 | Choi | 369/109 |
| 5,856,965 | 5/1996 | Tsuchiya et al. | 369/110 |
| 5,884,879 | 3/1997 | Morita et al. | 369/94 |

*Primary Examiner*—Nabil Hindi
*Attorney, Agent, or Firm*—Rabin & Champagne, PC

[57] ABSTRACT

A two-wavelength laser pick-up head used for accessing DVD, CD, CD-R and CD-E systems. The two-wavelength laser pick-up head includes a shorter wavelength laser optical path for reading the data from a DVD system, and a longer wavelength laser optical path for reading the data from a CD or CD-R system. The above two optical paths use the same collimator and the same objective lens. There is a compensator lens which is used in the longer wavelength laser optical path for correcting the spherical aberration due to the thick substrate of the CD or CD-R.

20 Claims, 11 Drawing Sheets

5,974,020

TWO-WAVELENGTH LASER PICK-UP HEAD FOR A DVD

BACKGROUND OF THE INVENTION

1. Field of the Invention

This invention relates to a pick-up head for Digital Versatile Disc (DVD), and more particularly, to a two-wavelength laser pick-up head which can be used for accessing DVD, Compact Disc (CD), CD-Recordable (CD-R) and CD-Erasable (CD-E) systems.

2. Description of the Related Art

The DVD pick-up head typically includes two focal points of different focal lengths. There are five different kinds of DVD pick-up heads described hereinafter. (1) FIG. 1, is a schematic diagram of a conventional DVD pick-up head of U.S. Pat. No. 4,399,529. As shown, this DVD pick-up head is a two-laser DVD pick-up head. One laser light of a single wavelength is used for writing. Another laser light is used for reading. Its disadvantage is that it is not applicable to the DVD systems. (2) The SONY DVD pick-up head is composed of two laser diodes and two pick-up heads. One is a DVD pick-up head, and another is a CD pick-up head. The disadvantage of the SONY DVD pick-up head is that it includes two objective lens. (3) The PANASONIC DVD pick-up head is composed of a laser diode and an objective lens. The disadvantage of the PANASONIC DVD pick-up head is that it includes an HOE objective lens which makes the efficiency of light lower. (4) The TOSHIBA DVD pick-up head is composed of a laser diode and two objective lens. (5) The SANYO DVD pick-up head is composed of a laser diode and an objective lens. Its disadvantage is the complicated design of the SANYO DVD pick-up head system.

SUMMARY OF THE INVENTION

It is therefore a primary object of the invention to provide a two-wavelength laser DVD pick-up head which uses only one objective lens to make two focal points of different focal lengths.

It is another object of the present invention to provide a two-wavelength laser DVD pick-up head which can be used for accessing DVD, CD, CD-R and CD-E systems.

The advantages and purposes of the invention will be set forth in part in the description which follows, and in part will be obvious from the description, or may be learned by practice of the invention.

To attain the objects and advantages of the invention, and in accordance with the purpose of the invention, as embodied and broadly described herein, the two-wavelength laser DVD pick-up head comprises two laser diodes with different wavelengths, a grating, a compensator lens for correcting the spherical aberration, a polarizing beam splitter, a collimator, a folding mirror, an objective lens, an optical disk for reflecting the light beam from the objective lens, and a photo-detector. The two-wavelength laser pick-up head comprises a shorter wavelength laser optical path (hereinafter also optical path) for reading the data from a DVD system, and a longer wavelength laser optical path for reading the data from a CD or CD-R system. The above two wavelength laser optical paths can use the same collimator and objective lens. The compensator lens is used in the longer wavelength laser optical path for correcting the spherical aberration which comes from the thick substrate of a CD or CD-R.

It is to be understood that both the foregoing general description and the following detailed description are exemplary and explanatory only and are not restrictive of the invention, as claimed.

BRIEF DESCRIPTION OF THE DRAWINGS

Other objects, features, and advantages of the invention will become apparent from the following detailed description of the preferred but non-limiting embodiments. The description is made with reference to the accompanying drawings in which.

DESCRIPTION OF THE PREFERRED EMBODIMENTS

The two-wavelength laser pick-up head is used for accessing DVD, CD, CD-R and CD-E systems. There are two optical paths in the system which use the two-wavelength laser pick-up head. One optical path is a shorter wavelength laser optical path for reading the data of a DVD system, and the other optical path is a longer wavelength laser optical path for reading the data of a CD or CD-R system. The shorter wavelength laser optical path can be either about 650 nm or about 635 nm. The longer wavelength laser optical path is about 780 nm. The two optical paths can use the same collimator and objective lens. The thickness of the substrate of the DVD is about 0.6 mm, while the thickness of the substrate of the CD or CD-R is about 1.2 mm. Because the substrate of the CD or CD-R is thick enough to generate a spherical aberration, a compensator lens is needed in the longer 780 nm wavelength laser optical path to correct the spherical aberration.

Figure 1:
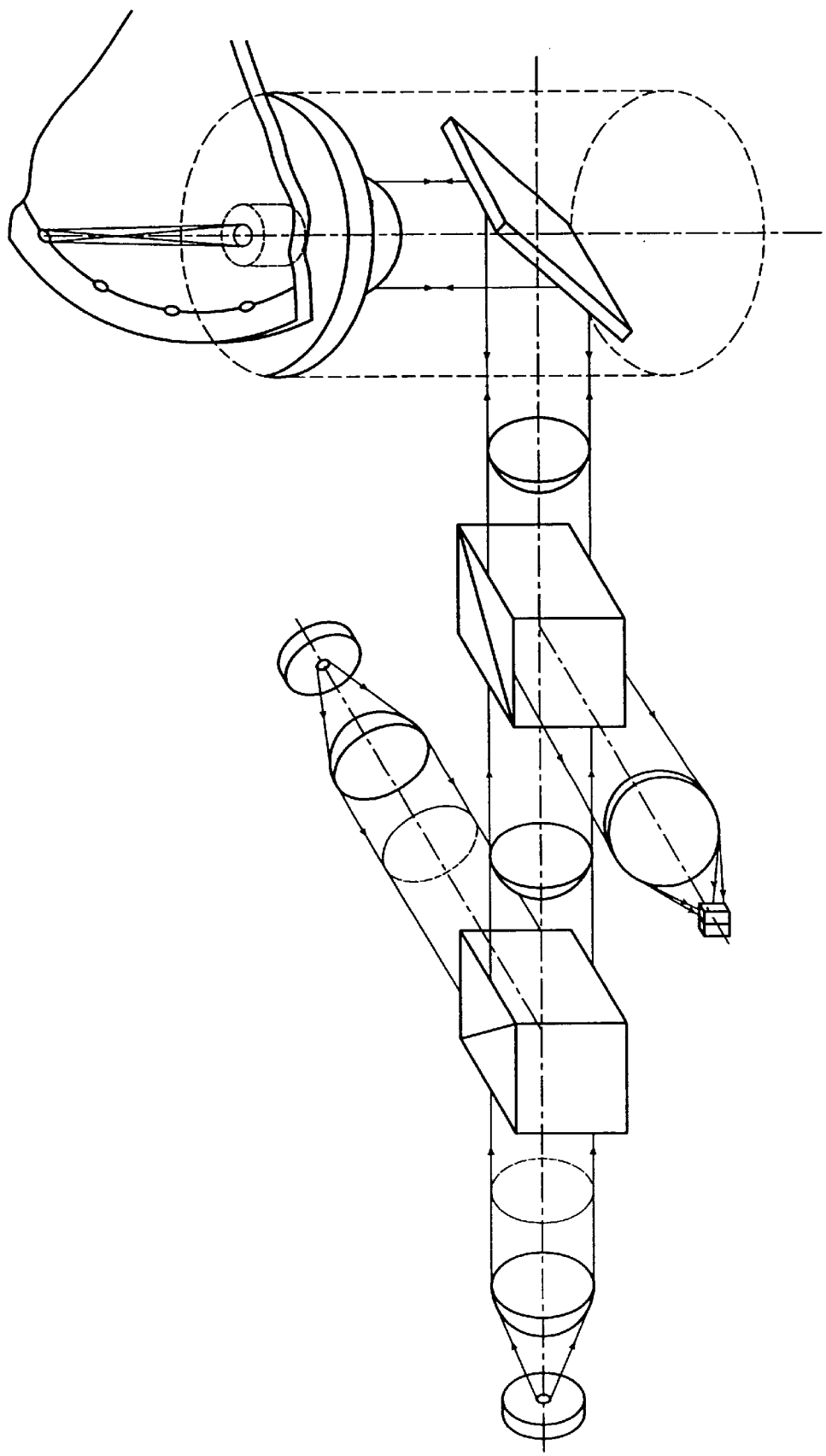
FIG. 1 is a schematic diagram of a conventional two-laser DVD pick-up head system.
Figure 2:
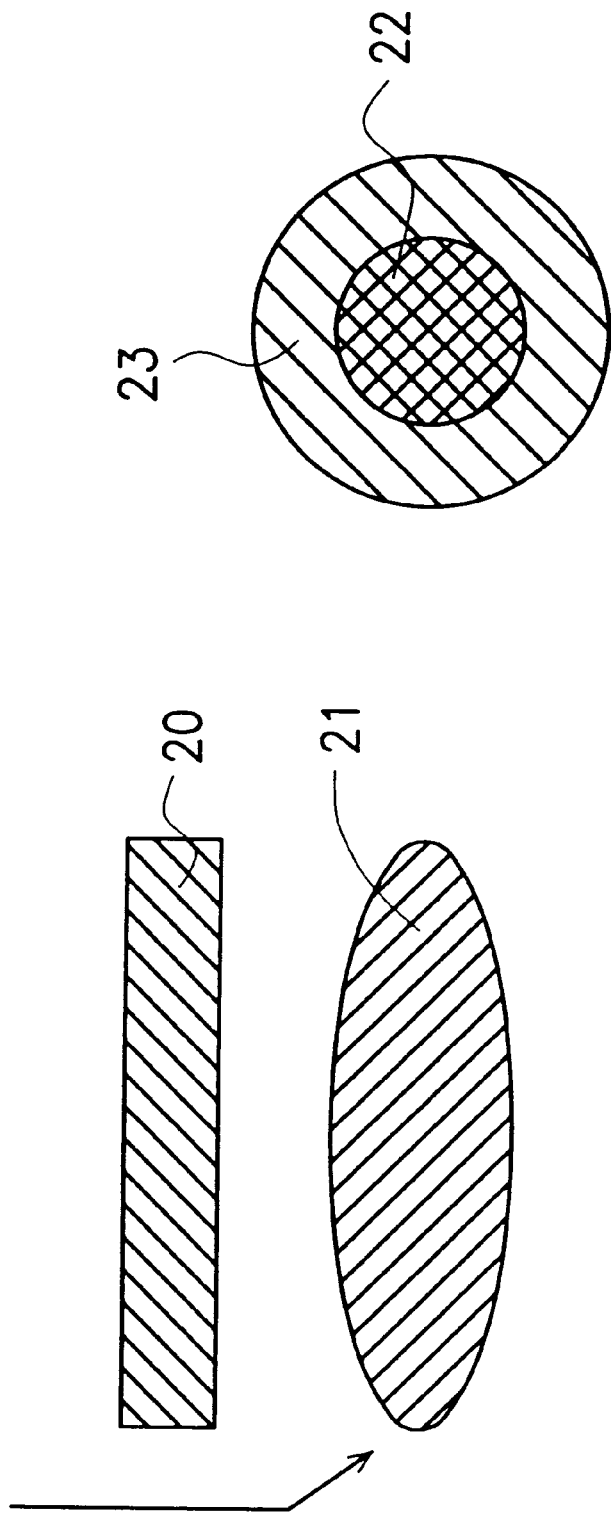
FIG. 2 is a schematic diagram of a part of the two-wavelength laser pick-up head according to the present invention.

The compensator lens which is used in the longer 780 nm wavelength laser optical path can change the Numerical Aperture (NA) of the objective lens from about 0.6 to 0.55 for reading a CD or CD-R. Additionally, the surface of the objective lens facing the CD or CD-R can be coated to change the NA of the objective lens. For example, such coating can change the NA to about 0.5 or about 0.45. As shown in FIG. 2, the surface of the objective lens 21 facing disc 20 can be coated for changing the NA of the objective lens 21. There is an inner ring region 22 and an outer ring region 23 on the surface of the objective lens 21. The inner ring region 22 is the aperture of the CD system (about 0.38), and the outer ring region 23 is the aperture of the DVD system (about 0.6).

Table 1 shows the Wavefront Aberration (WA) of the two-wavelength laser DVD pick-up head according to the present invention.

TABLE 1

| Lens | NA | wavelength | thickness of substrate | WA |
|---|---|---|---|---|
| 1 | 0.6 | 635 nm | 0.6 mm | 0.002 |
| 2 | 0.38 | 780 nm | 1.2 mm | 0.069 |

TABLE 1-continued

| Lens | | NA | wavelength | thickness of substrate | WA |
|---|---|---|---|---|---|
| 3 | spherical | 0.38 | 780 nm | 1.2 mm | 0.002 |
| 4 | aspherical | 0.55 | 780 nm | 1.2 mm | 0.027 |

Figure 3A:
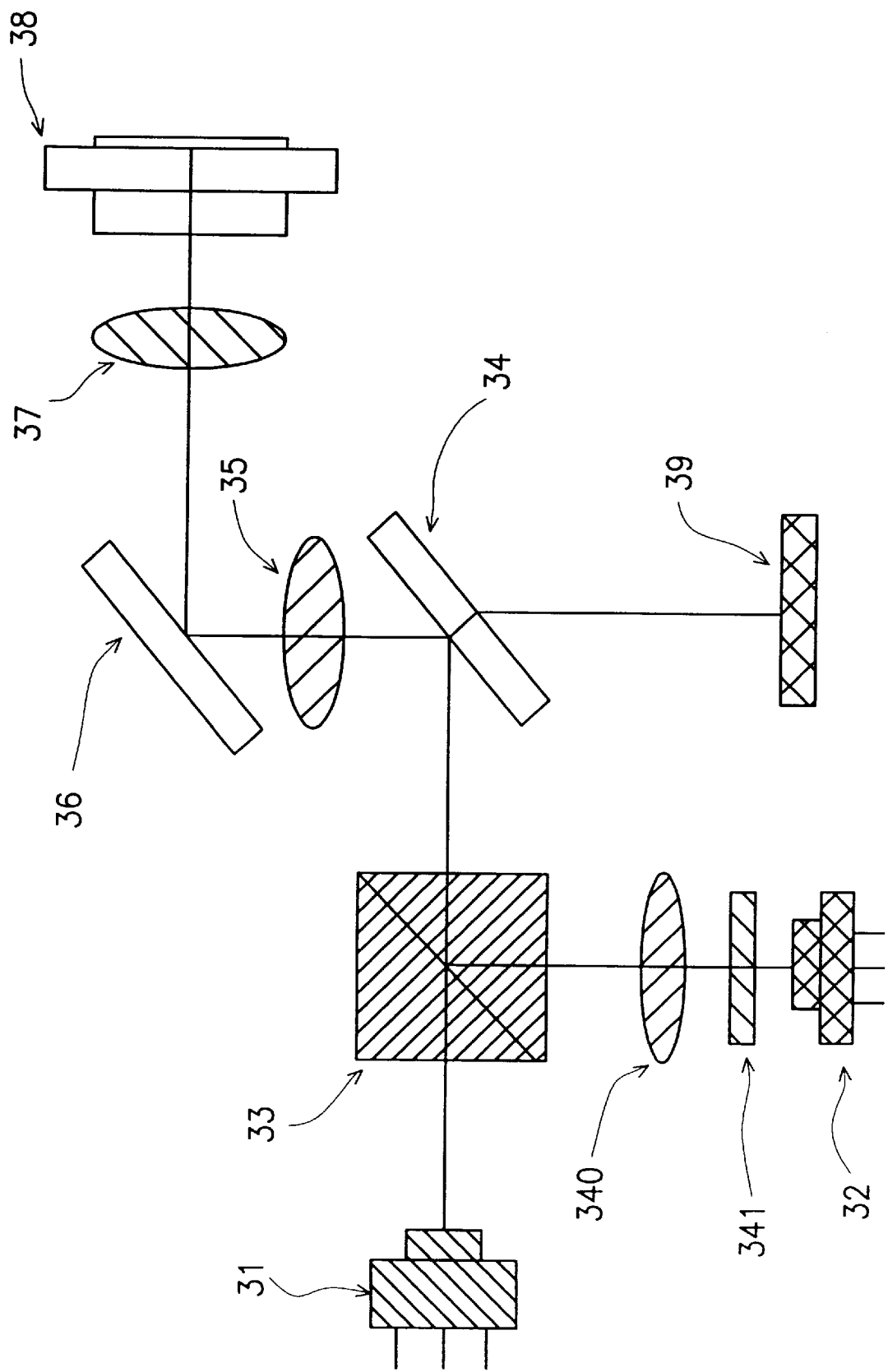
FIG. 3A to FIG. 3F are schematic diagrams of the first preferred embodiment of the two-wavelength laser pick-up head for a DVD system, according to the present invention.

FIG. 3A to FIG. 3F are schematic diagrams of the first preferred embodiment of the two-wavelength laser pick-up head for a DVD system according to the present invention. As shown in FIG. 3A, there are two laser diodes 31 and 32 for generating a light beam. The wavelength generated by the laser diode 31 is either about 650 nm or about 635 nm. The wavelength generated by the laser diode 32 is about 780 nm. The light beam from the two laser diodes 31 and 32 passes through the Polarization Beam Splitter (PBS) 33, the Beam Splitter (BS) 34, the collimator 35, the Folding Mirror (FM) 36, and the objective lens 37 to arrive at the optical disk 38. The light beam is reflected by the optical disk 38. Then, the light beam passes back through the objective lens 37, the FM 36, the collimator 35 and the BS 34 to arrive at the Photo-Detector (PD) 39. The optical disk 38 comprises either the DVD or CD (or CD-R). The optical path of the 780 nm light beam is for reading the DVD. The optical path of the 650 nm (or 635 nm) light beam is for reading the CD or CD-R. Because the design of the objective lens 37 is dependent upon the DVD (the thickness of the DVD is 0.6 mm), the objective lens 37 is not suitable for reading the CD or CD-R (the thickness of the CD or CD-R is 1.2 mm). When the optical path of the 780 nm light beam focus upon the CD or CD-R, the thickness difference of disc substrates induces a spherical aberration. Therefore, a compensator lens 340 is added in the optical path of the 780 nm light for correcting the spherical aberration. The compensator lens 340 can change the NA of the objective lens 37 from about 0.6 to about 0.55 for reading CD or CD-R correctly. The compensator lens 340 is set between the PBS 33 and grating 341, which is used for diffracting the light beam. The two-wavelength laser pick-up head DVD system uses the astigmatism focusing method, which uses a flat beam splitter for generating astigmatism light. The compensator lens 340 can comprise a spherical lens, but is preferably a aspherical lens. The compensator lens 340 and the PBS 33 can be combined into a plate-concave lens.

Figure 3B:
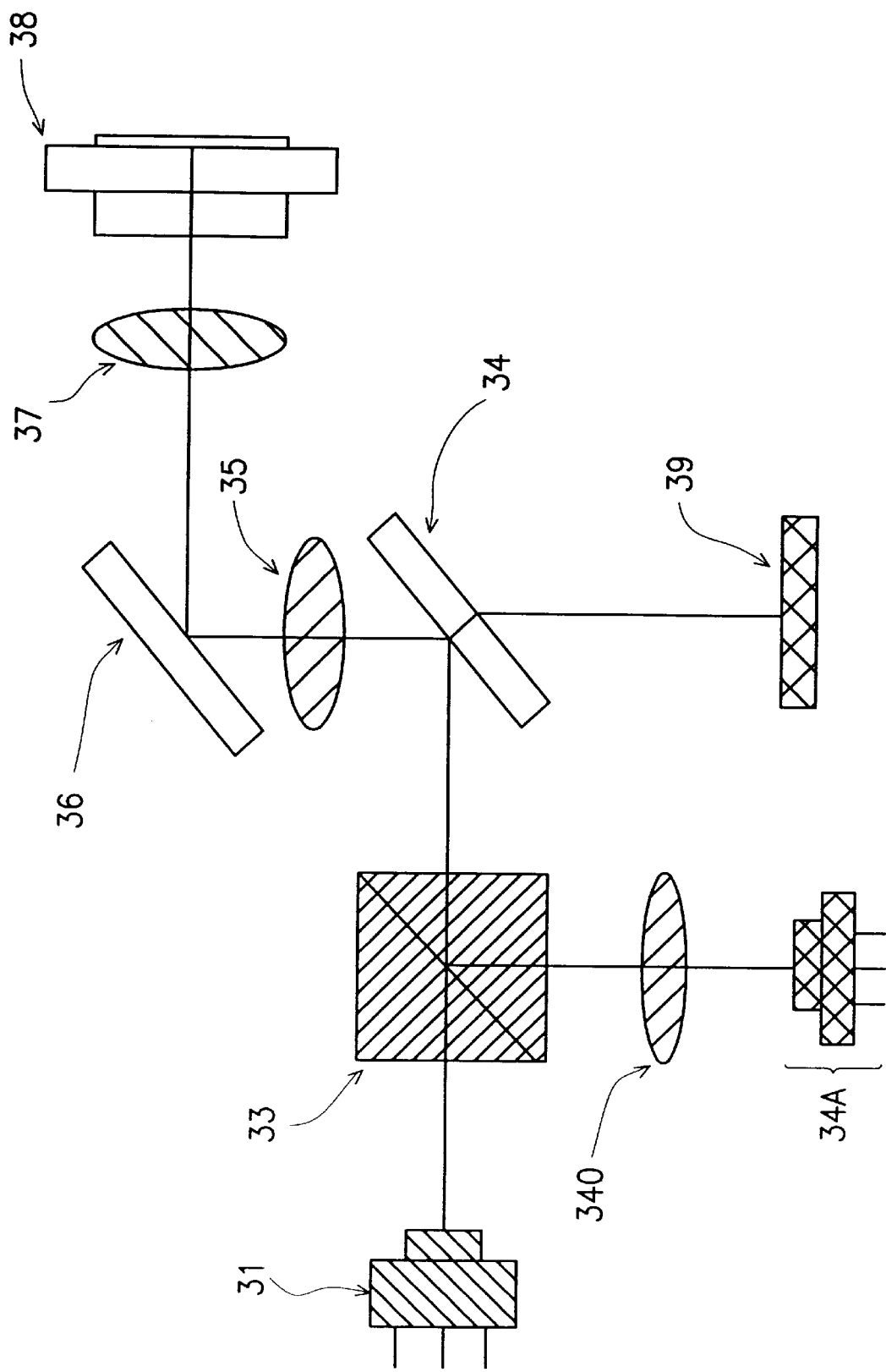
Figure 3C:
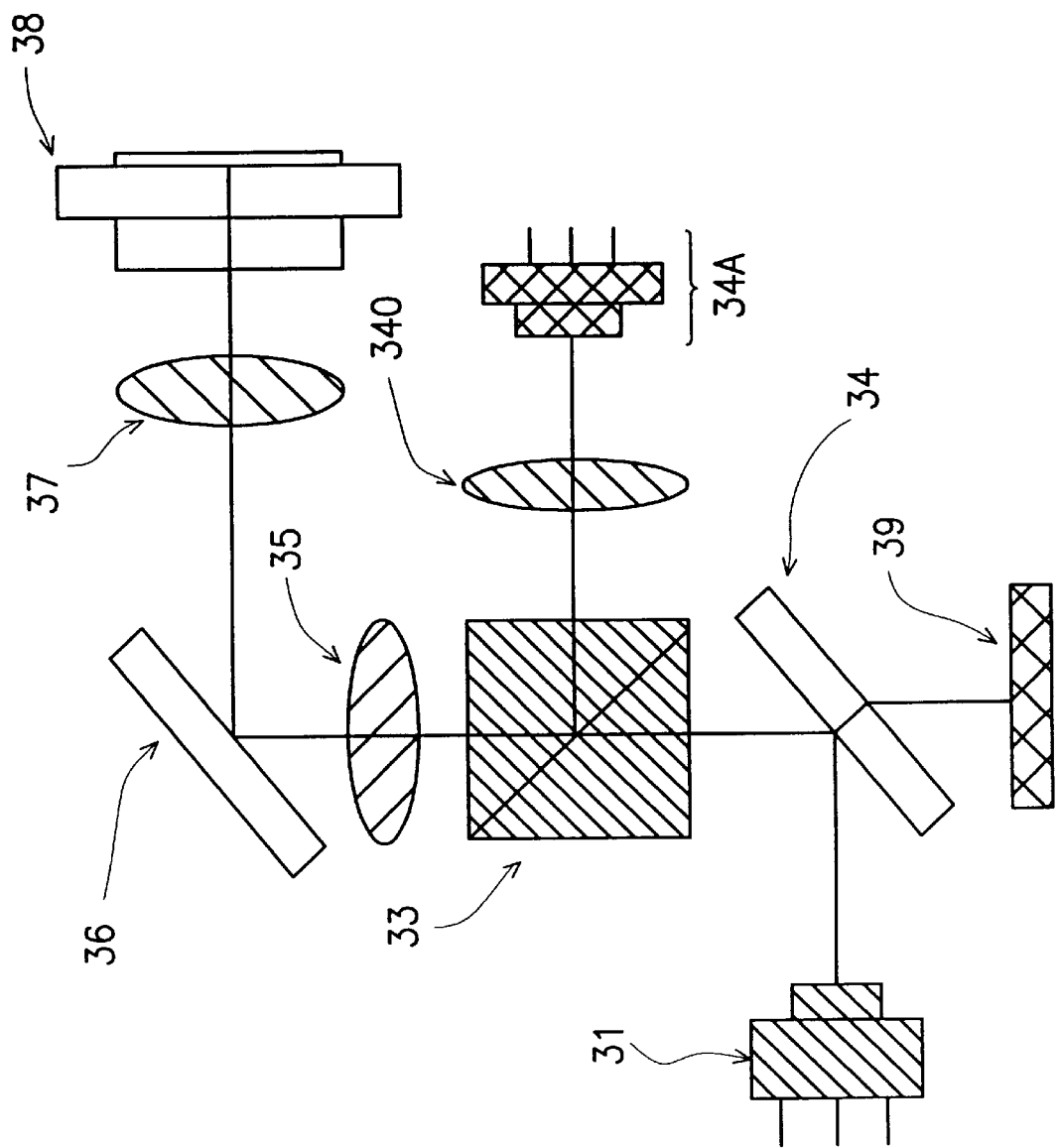

The present invention also proposes coating the surface of the objective lens 37 facing the optical disk 38 for changing the NA. Therefore, the NA can be changed to about 0.5 or about 0.45. In FIG. 3A, the compensator lens 340 preferably comprises a spherical lens or aspherical lens. On the other hand, as shown in FIG. 3B and FIG. 3C, a hologram unit 34A can be used instead of the laser diodes 32 and the grating 341.

Figure 3D:
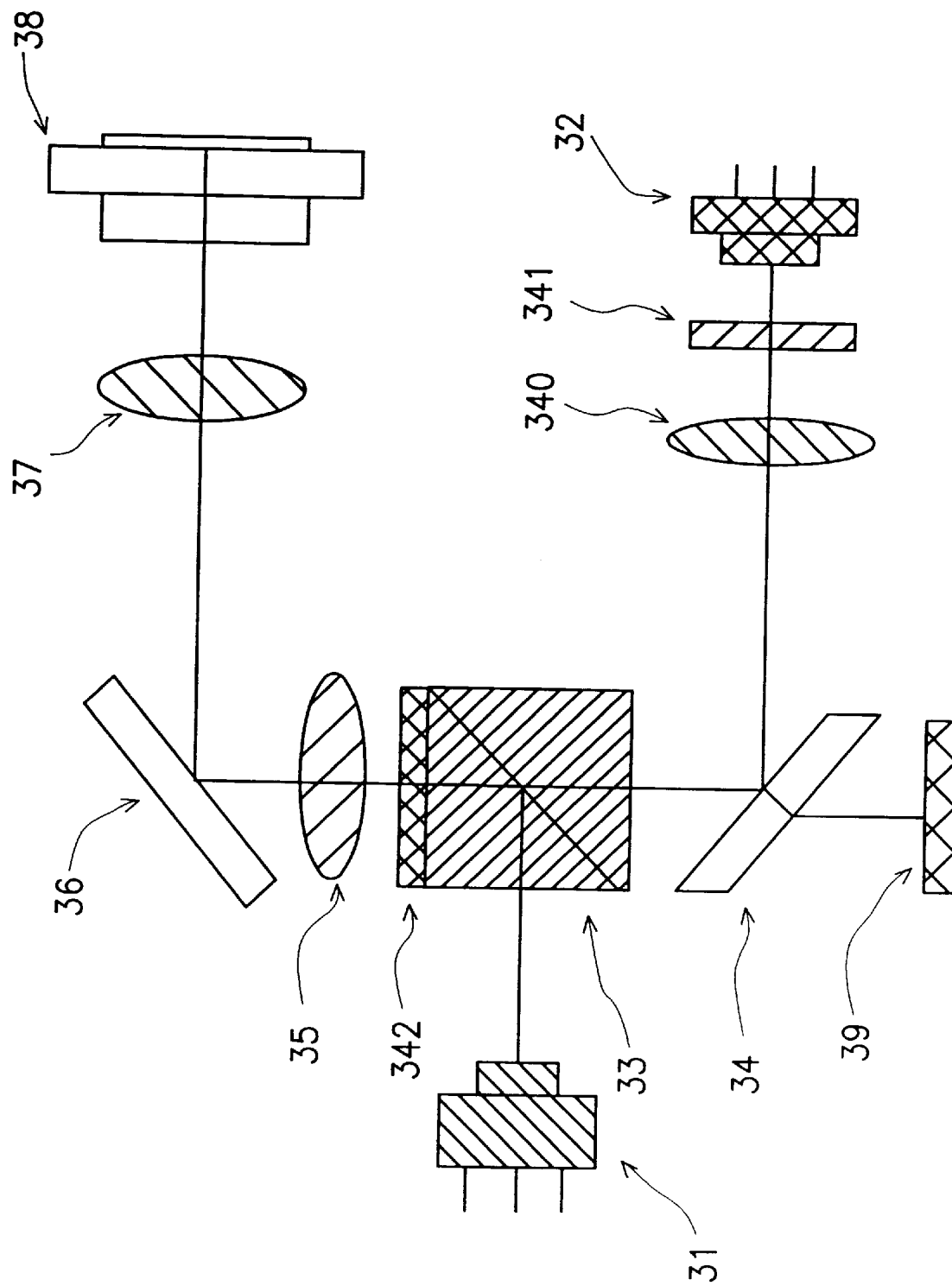
Figure 3E:
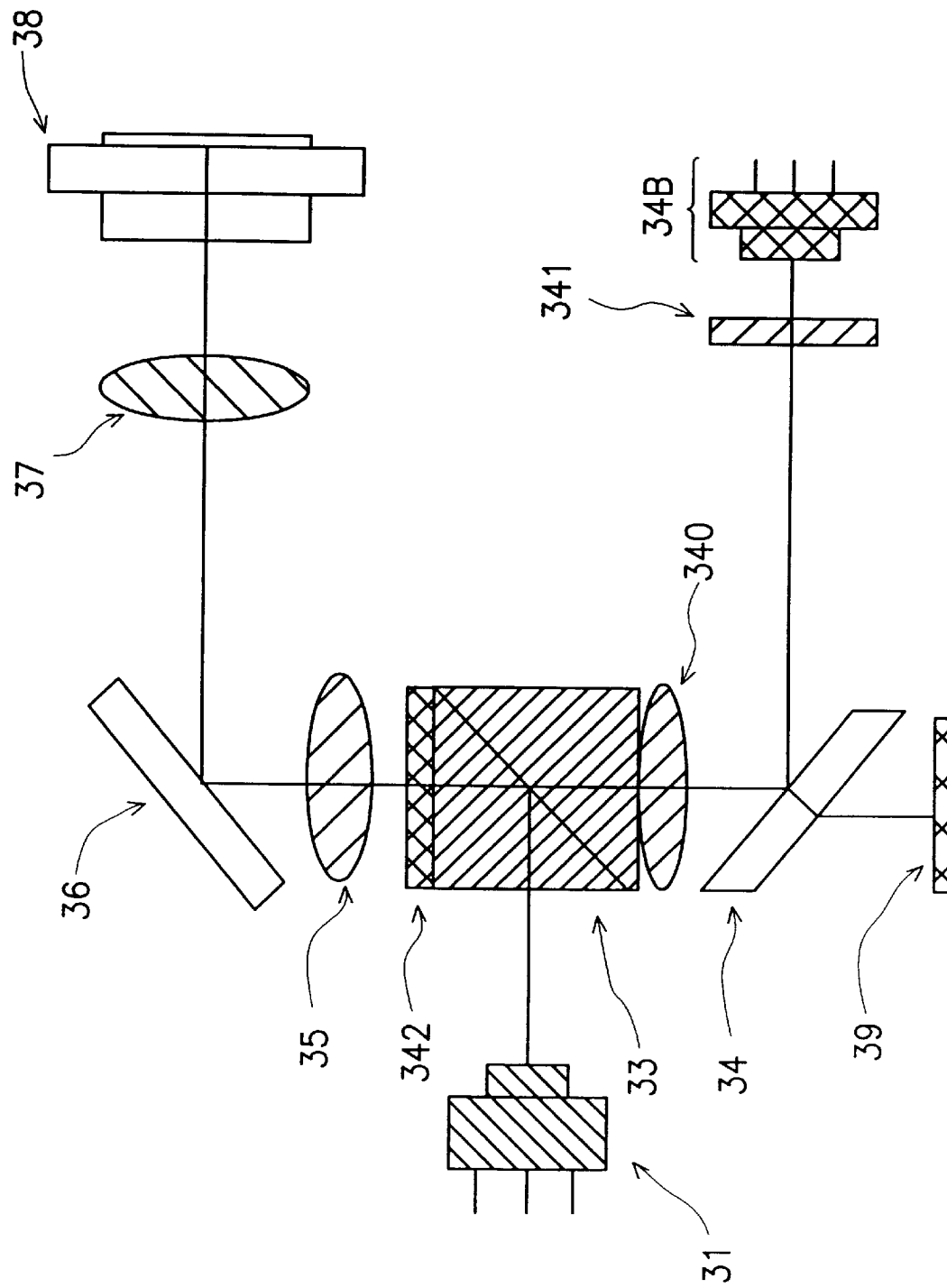
Figure 3F:
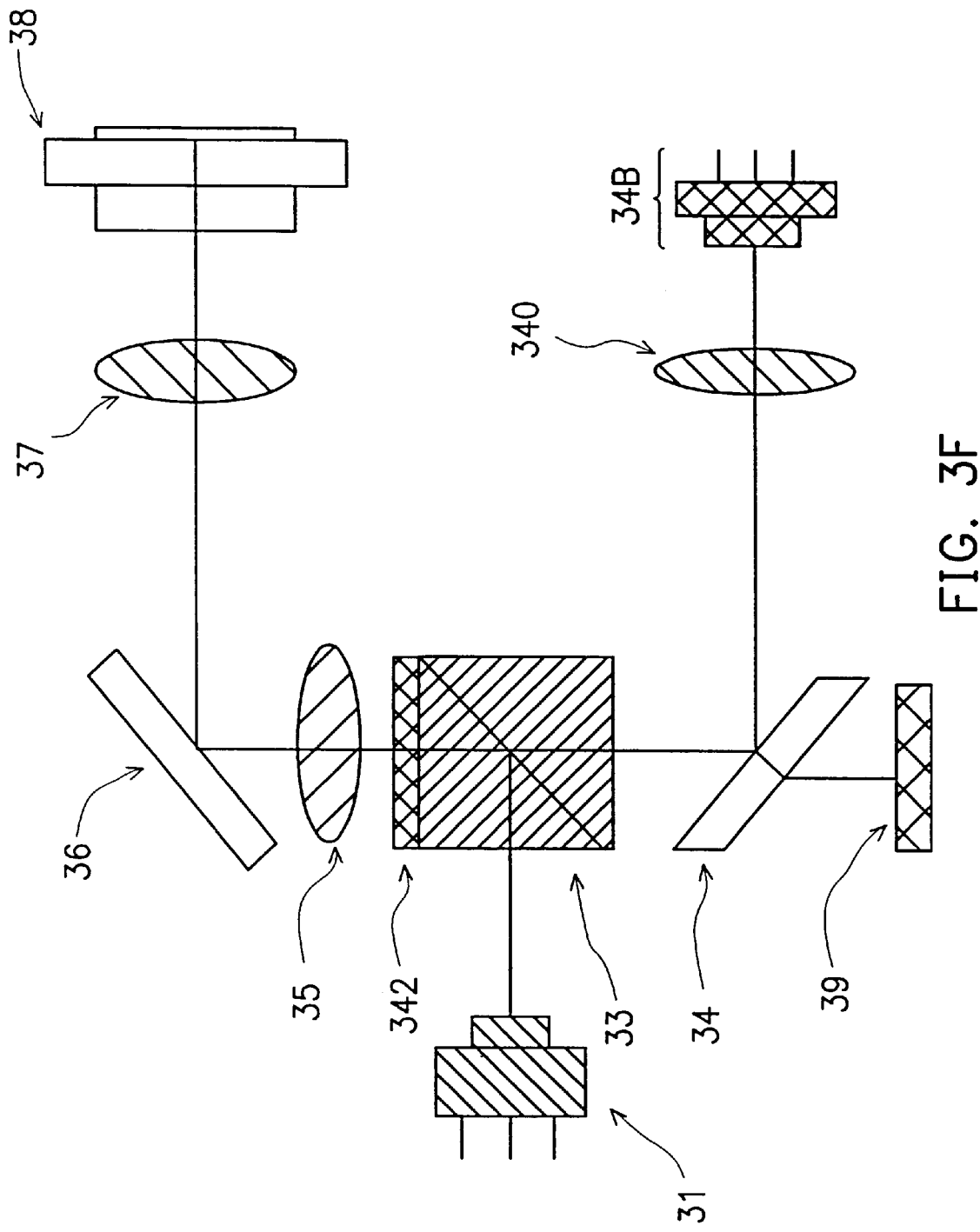

The embodiment shown in FIG. 3D is almost the same as that shown in FIG. 3A. The difference is that this embodiment adds a ¼ wave plate 342 to the PBS 33, as well as coating the surface of the objective lens 37. As shown in FIG. 3E, the compensator lens 340 and the PBS 33 can be combined to become a plate-concave lens. Further, as shown in FIG. 3F, the optical path of the 780 nm laser light can be generated from a hologram unit 34B instead of from the laser diodes 32 and the grating 341.

Figure 4A:
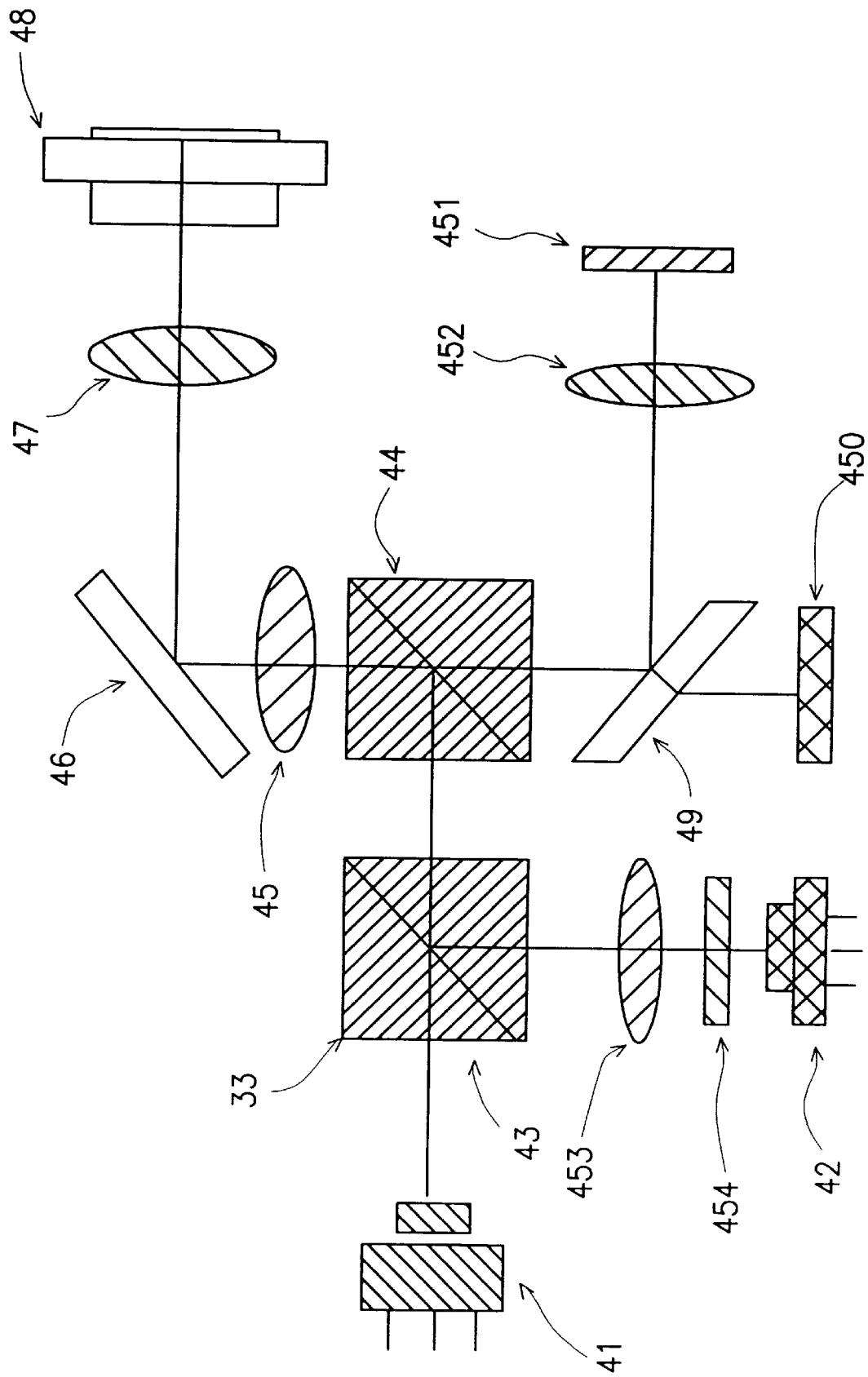
FIG. 4A and FIG. 4B are schematic diagrams of the second preferred embodiment of the two-wavelength laser pick-up head for a DVD system, according to the present invention.
Figure 4B:
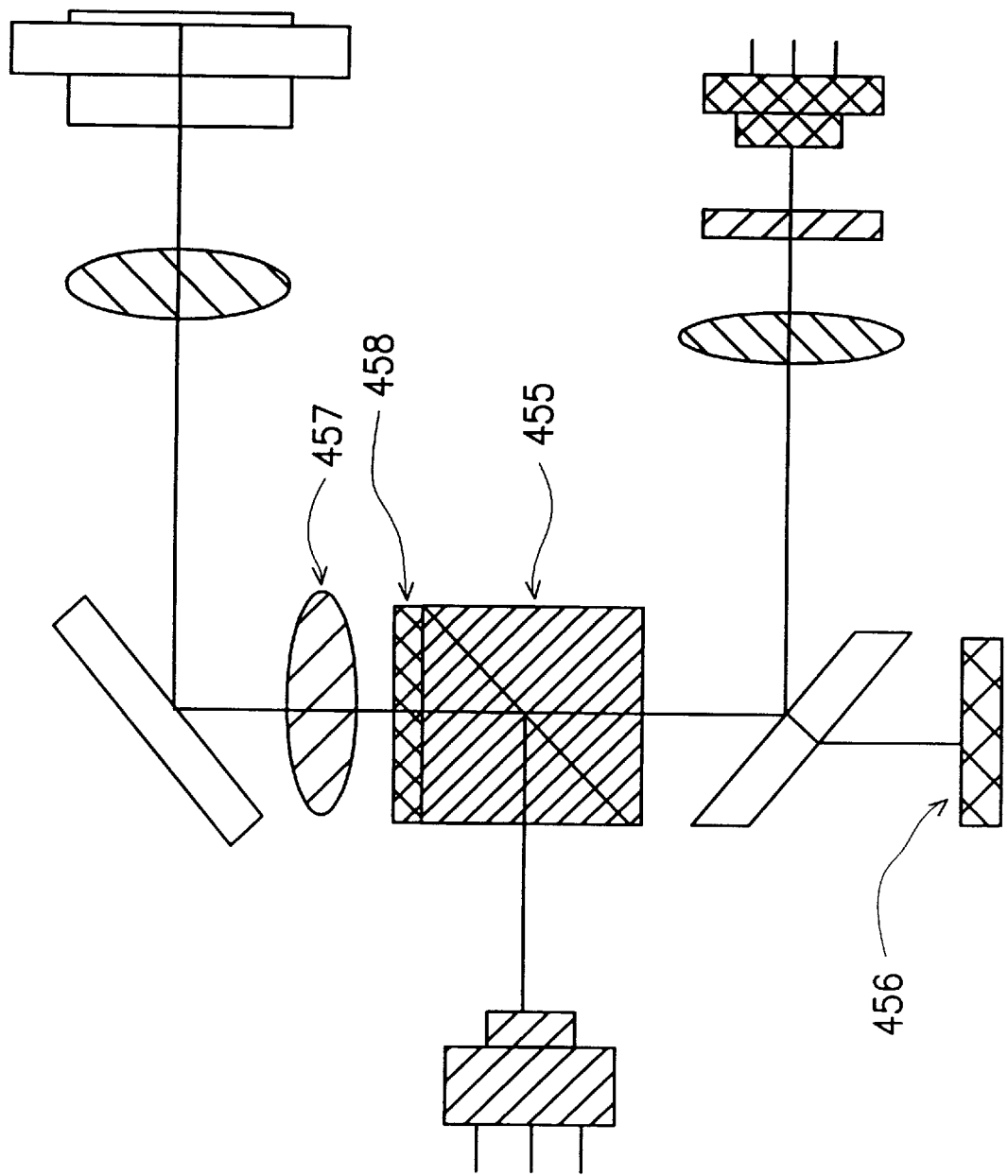

FIG. 4A and FIG. 4B are schematic diagrams of a further preferred embodiment of the two-wavelength laser pick-up head for DVD systems, according to the present invention. FIG. 4A and FIG. 4B are similar to the embodiments shown in FIG. 3A and FIG. 3D. The main difference is that this embodiment comprises a cubic beam splitter for dividing the light beam into two light beams. One of the two light beams uses a cylindric lens for generating an astigmatism. As shown in FIG. 4A, there are two laser diodes 41 and 42 for generating light beams. The wavelength of the laser diode 41 is either 650 nm or 635 nm. The wavelength of the laser diode 42 is 780 nm. The light beam from the two laser diodes 41 and 42 passes through the PBS 43 and 44, the collimator 45, the FM 46, and the objective lens 47 to impinge upon the optical disk 48. The light beam is reflected by the optical disk 48. Then, the light beam passes back through the objective lens 47, the FM 46, the collimator 45, the PBS 44 to arrive at the PD 450 and 451. The optical disk 48 comprises either the DVD or CD (or CD-R). The optical path of the 780 nm light beam is for reading the DVD. The optical path of the 650 nm (or 635 nm) light beam is for reading the CD or CD-R. The optical path to the PD 451 includes the cylindric lens 452 for generating astigmatism light. Because the design of the objective lens 47 is dependent upon the DVD (the thickness of the DVD is 0.6 mm), the objective lens 47 is not suitable for reading the CD or CD-R (the thickness of the CD or CD-R is 1.2 mm). When the optical path of the 780 nm light focus on the CD or CD-R, the thickness difference of disc substrates results in a spherical aberration. Therefore, a compensator lens 453 is added in the optical path of the 780 nm light for correcting the spherical aberration. Further, a grating 454 is provided for diffracting the light beam. The two-wavelength laser pick-up head DVD system uses the astigmatism focusing method, which uses a flat beam splitter for generating astigmatism light. The compensator lens 453 can change the NA of the objective lens 47 for reading a CD or CD-R for correcting the spherical aberration. The present invention also proposes coating the surface of the objective lens 47 facing the optical disk 48 for changing the NA.

The embodiment shown in FIG. 4B, is similar to FIG. 3D. This embodiment has only one PBS 455 and one PD 456, but does not have a cylindric lens for generating an astigmatism. Further, this embodiment adds a ¼ wave plate 458 between the PBS 455 and the collimator 457.

Figure 5:
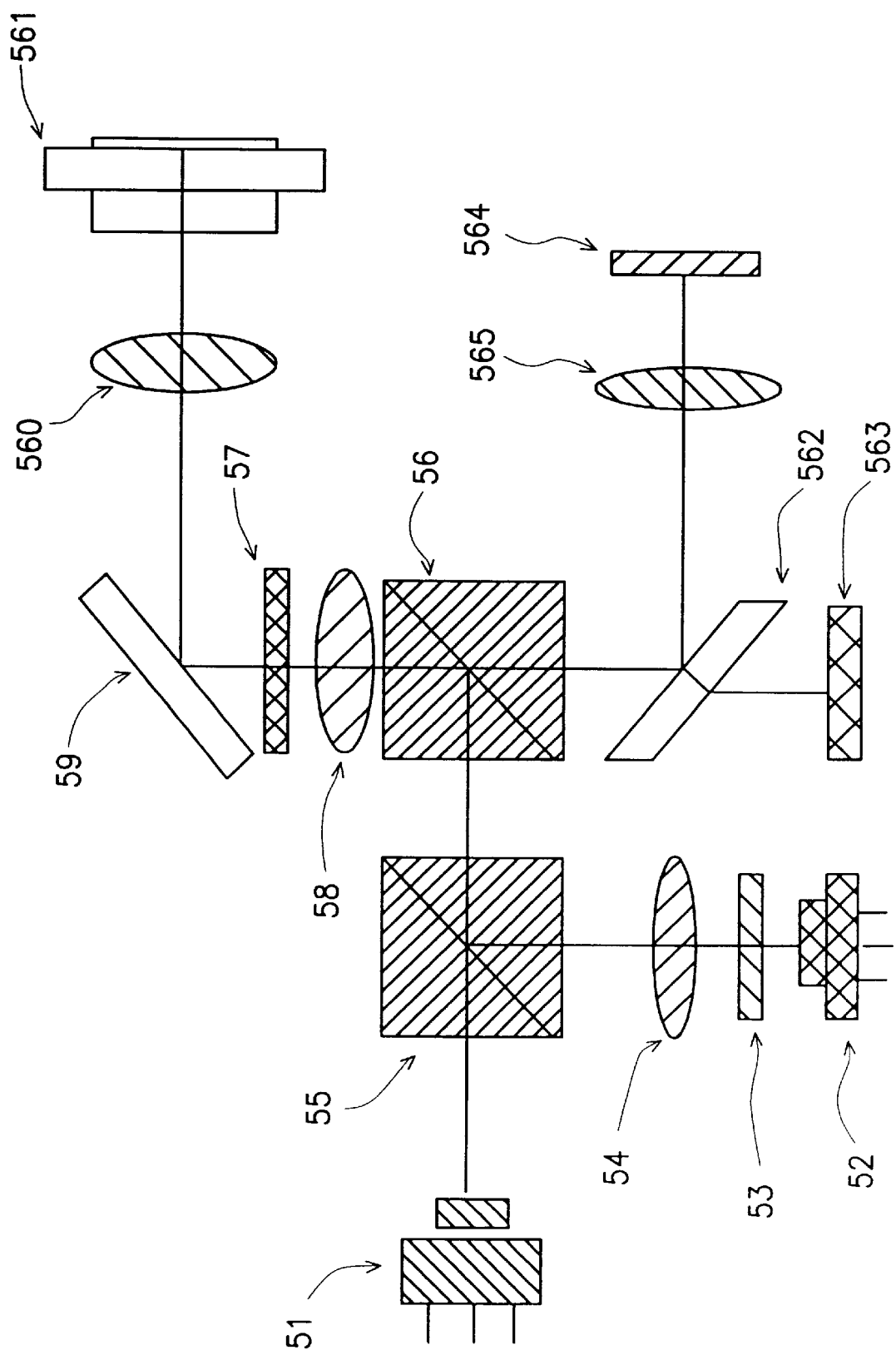
FIG. 5 is a schematic diagram of the third preferred embodiment of the two-wavelength laser pick-up head for a DVD system according to the present invention.

FIG. 5 is a schematic diagram of yet a further preferred embodiment of the two-wavelength laser pick-up head for a DVD system, according to the present invention. This preferred embodiment can also read a DVD-E. As shown in FIG. 5, there are two laser diodes 51 and 52 for generating light beams. The wavelength of the laser diode 51 is either 650 nm or 635 nm. The wavelength of the laser diode 52 is 780 nm. The light beam from the laser diode 52 passes through the grating 53 and the compensator lens 54. Then, this light beam meets the light beam from the laser diode 51 on the dicrom-prism or the dicromirror 55. The dicrom-prism or the dicromirror 55 allows the light of one single wavelength to be transmitted, while reflecting the light of another single wavelength. Therefore, it can couple the two light beams from two laser diodes 51 and 52 together to form one light beam. The coupled light beam then passes through the PBS 56 and the ¼ wave plate 57, which is for the 635 nm or 650 nm light beam. The ¼ wave plate 57 divides the 635 nm or 650 nm light beam with the 780 nm light beam so as to lift the efficiency of the light incident on the optical disk 561. Therefore, this embodiment can write into the Phase Changeable Erasable DVD-E. The light from the ¼ wave plate 57 passes through the collimator 58 (or first passes through the collimator 58 and then the ¼ wave plate 57). Then, the light passes through the FM 59, the objective lens 560 and then focuses on the optical disk 561 for reading or writing data. The light reflected by the optical disk 561 passes through the objective lens 560, the FM 59, the collimator 58 and the ¼ wave plate 57. Here, the polarization of the reflected light and the polarization of the incident light is perpendicular. Thus, the feed back noise will reduce and the efficiency the light is increased. The reflected light from the PBS 56 then passes through the BS 562 to the PD 563 and PD 564. Before the light reaches the PD 564, it passes through the cylindric lens 565 so as to generate astigmatism light.

The present invention has the following advantages:

(1) The optical devices of the two-wavelength laser pick-up head system is less complex than the prior art devices. It therefore lighter, and has a better frequency distribution.

(2) The present invention can be used to read or write to DVD-E, and the efficiency of the light is better than in the prior art.

(3) The present invention costs less and has better a effect.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A two-wavelength laser pick-up head, comprising:
    a first laser diode for generating a first light beam;
    a second laser diode for generating a second light beam having a second wavelength shorter than the wavelength of the first light beam;
    a grating for receiving the first light beam from the first laser diode;
    a compensator lens for receiving the first light beam from the grating;
    a polarizing beam splitter for receiving the second light beam from the second laser diode and the first laser beam from the compensator lens;
    a beam splitter for receiving the first and the second light beams from the polarizing beam splitter;
    a collimator for receiving the first and the second light beams from the beam splitter;
    a folding mirror for receiving the first and the second light beams from the collimator;
    a coated objective lens for receiving the first and the second light beams from the folding mirror, the coated objective lens comprising an inner ring region and an outer ring region, the inner ring region being an aperture of the CD system, and the outer ring region being an aperture of the DVD system;
    an optical disk for reflecting the first and the second light beams from the coated objective lens; and
    a photo-detector for receiving the first and the second light beams reflected from the optical disk, wherein the beam splitter, the collimator and the coated objective lens are disposed in the above order.

2. The two-wavelength laser pick-up head of claim 1, wherein the compensator lens corrects a spherical aberration.

3. The two-wavelength laser pick-up head of claim 1, wherein the pick-up head uses astigmatism focusing.

4. The two-wavelength laser pick-up head of claim 1, wherein the compensator lens is a aspherical lens.

5. The two-wavelength laser pick-up head of claim 1, wherein the coated objective lens is coated on a surface thereof facing the optical disk for changing a numerical aperture.

6. The two-wavelength laser pick-up head of claim 5, wherein the compensator lens is a spherical lens.

7. The two-wavelength laser pick-up head of claim 5, further comprising a ¼ wave plate which is mounted on the polarizing beam splitter.

8. The two-wavelength laser pick-up head of claim 1, wherein the wavelength of the second light beam is about 650 nm.

9. The two-wavelength laser pick-up head of claim 1, wherein the wavelength of the second light beam is about 635 nm.

10. The two-wavelength laser pick-up head of claim 1, wherein the wavelength of the first light beam is about 780 nm.

11. A two-wavelength laser pick-up head, comprising:
    a first laser diode for generating a first light beam;
    a second laser diode for generating a second light beam having a second wavelength shorter than the wavelength of the first light beam;
    a grating for receiving the first light beam from the first laser diode;
    a compensator lens for receiving the first light beam from the grating and for correcting a spherical aberration;
    a first polarizing beam splitter for receiving the second light beam from the second laser diode and the first light beam from the compensator lens;
    a second polarizing beam splitter for receiving the first and the second light beams from the first polarizing beam splitter;
    a collimator for receiving the first and the second light beams from the second polarized beam splitter;
    a folding mirror for receiving the first and the second light beams from the collimator;
    a coated objective lens for receiving the first and the second light beams from the folding mirror, the coated objective lens comprises an inner ring region and an outer ring region, the inner ring region being an aperture of the CD system, and the outer ring region being an aperture of the DVD system;
    an optical disk for reflecting the first and the second light beams from the coated objective lens;
    a beam splitter for dividing the first and the second light beams reflected from the optical disk into a third light beam and a fourth light beam;
    a first photo-detector for receiving the third light beam; and
    a second photo-detector for receiving the fourth light beam, wherein the first polarizing beam splitter, the second polarizing beam splitter, the collimator and the costed objective lens are deposited in the above order.

12. The two-wavelength laser pick-up head of claim 11, wherein the wavelength of the second light beam is about 650 nm.

13. The two-wavelength laser pick-up head of claim 11, wherein the wavelength of the second light beam is about 635 nm.

14. The two-wavelength laser pick-up head of claim 11, wherein the wavelength of the first light beam is about 780 nm.

15. A two-wavelength laser pick-up head, comprising:
    a first laser diode for generating a first light beam
    a second laser diode for generating a second light beam having a wavelength shorter than the wavelength of the first light beam;

a grating for receiving the first light beam from the first laser diode;

a compensator lens for receiving the first light beam from the grating and for correcting a spherical aberration;

means for receiving the second light beam from the second laser diode and the first light beam from the compensator lens, for transmitting either the first light beam or the second light beam;

a polarizing beam splitter for receiving the transmitted light beam from the means; a ¼ wave plate mounted on the polarizing beam splitter for receiving the transmitted light beam therefrom;

a collimator for receiving the transmitted light beam from the ¼ wave plate;

a folding mirror for receiving the transmitted light beam from the collimator;

a coated objective lens for receiving the transmitted light beam from the folding mirror, the coated objective lens comprising an inner ring region and an outer ring region, the inner ring region being an aperture of the CD system and the outer ring region being an aperture of the DVD system;

an optical disk for reflecting the transmitted light beam from the coated objective lens;

a beam splitter for dividing the transmitted light beam reflected from the optical disk into a third light beam and a fourth light beam; and a first photo-detector for receiving the third light beam; and a second photo-detector for receiving the fourth light beam, wherein the polarizing beam splitter, the collimator and the coated objective lens are disposed in the above order.

16. The two-wavelength laser pick-up head of claim 15, wherein the wavelength of the second light beam is about 650 nm.

17. The two-wavelength laser pick-up head of claim 15, wherein the wavelength of the second light beam is about 635 nm.

18. The two-wavelength laser pick-up head of claim 15, wherein the wavelength of the first light beam is about 780 nm.

19. The two-wavelength laser pick-up head of claim 15, wherein the means for receiving the first and the second light beams is a bicolor-prism.

20. The two-wavelength laser pick-up head of claim 15, wherein the means for receiving the first and the second light beams is a dicromirror.

* * * * *